United States Patent [19]

Johnstone

[11] 4,396,533

[45] Aug. 2, 1983

[54] POLYMERIZATION CATALYST

[75] Inventor: Alexander Johnstone, Stenhousemuir, Scotland

[73] Assignee: BP Chemicals Limited, London, England

[21] Appl. No.: 343,248

[22] Filed: Jan. 27, 1982

[51] Int. Cl.$^3$ ............................................... C08F 4/64
[52] U.S. Cl. ........................... 252/429 B; 252/429 C; 526/114; 526/116; 526/119; 526/121; 526/124; 526/128; 526/129; 526/132; 526/134
[58] Field of Search ........................ 252/429 B, 429 C

[56] References Cited

U.S. PATENT DOCUMENTS

| | | | |
|---|---|---|---|
| 3,166,544 | 1/1965 | Orzechowski et al. | 252/429 C X |
| 3,280,096 | 10/1966 | MacKenzie | 252/429 C X |
| 3,711,423 | 1/1973 | Mertzweiller et al. | 252/429 C X |
| 3,809,657 | 5/1974 | Mueller-Tamm et al. | 252/429 C |
| 3,884,832 | 5/1975 | Pullurat et al. | 252/429 C |
| 4,145,312 | 3/1979 | Matheson | 252/429 B |

FOREIGN PATENT DOCUMENTS

| | | |
|---|---|---|
| 1256851 | 12/1971 | United Kingdom . |
| 1306044 | 2/1973 | United Kingdom . |
| 1486854 | 9/1977 | United Kingdom . |
| 1489410 | 10/1977 | United Kingdom . |
| 1562200 | 3/1980 | United Kingdom . |

Primary Examiner—Patrick Garvin
Attorney, Agent, or Firm—Brooks, Haidt, Haffner & Delahunty

[57] ABSTRACT

A supported Ziegler catalyst prepared by the following steps:
(A) heating together at a temperature in the range of 250° to 1100° C. a refractory oxide support material having surface hydroxyl groups and one or more halogen-free metal derivatives which are hydrides and/or organic derivatives of the metal.
(B) reacting the product from (A) with one or more organometallic compounds having the feneral formula $MR^1_aQ_{b-a}$ wherein M is a metal atom, $R^1$ is a hydrocarbon group, Q is a halogen or an oxyhydrocarbyl group, b is the valency of M and a is an integer from 1 to b and wherein the metal atom M is aluminium, boron, lithium, zinc or magnesium,
(C) impregnating the solid product from step (B) with one or more halogen-containing transition metal compounds wherein the transition metal or metals comprise titanium and/or vanadium and/or zirconium.

15 Claims, No Drawings

POLYMERIZATION CATALYST

The present invention relates to a supported Ziegler catalyst for polymerising 1-olefins and to a process for polymerising 1-olefins employing the catalyst.

It has long been known that 1-olefins such as ethylene can be polymerised by contacting them under polymerisation conditions with a catalyst obtained by activating a transition metal-containing component, e.g. a titanium compound such as titanium tetrachloride, with an activator or co-catalyst, e.g. an organo-metallic compound such as triethylaluminium. Catalysts comprising the transition metal-containing component and the co-catalyst or activator are generally referred to in the art as "Ziegler catalyts" and this terminology will be used throughout this specification.

The Ziegler catalyst component comprising the transition metal can be used either in an unsupported condition, or supported on support materials such as silicon carbide, calcium phosphate, silica, magnesium carbonate and sodium carbonate.

UK Patent Specification No. 1,256,851 discloses a catalyst for the low-pressure polymerisation and copolymerisation of olefins, comprising:
  (a) an organometallic compound, or an organosilicon compound having at least one Si-H bond, and
  (b) a solid product obtained by reacting a substantially anhydrous support consisting of a solid bivalent-metal compound with an organometallic compound, or an organosilicon compound having at least one Si-H bond, this being either identical to or different from "(a)", separating the solid product resulting from the reaction, reacting this product with a halogenated derivative of a transition metal, and separating the final solid reaction product; the molar ratio of "(a)" to the transition metal chemically bonded to the support being at least 2.

UK Patent 1,306,044 relates inter alia to a process for polymerising alpha-olefins using a catalyst comprising an organometallic compound and the solid product obtained by reacting silica or alumina with an excess of a compound of the formula $MR_nX_{m-n}$ wherein M is aluminium or magnesium, R is a hydrocarbon radical, X is hydrogen or halogen, m is the valency of M and n is a whole number not greater than m, separating and washing the solid product and reacting it with an excess of a halogen-containing transition metal compound and separating the solid reaction product.

It is an object of the present invention to provide an improved supported Ziegler catalyst.

Accordingly the present invention provides a supported Ziegler catalyst prepared by the following steps:
  (A) heating together at a temperature in the range 250° to 1100° C. a refractory oxide support material having surface hydroxyl groups and one or more halogen-free metal derivatives which are hydrides and/or organic derivatives of the metal,
  (B) reacting the product from step (A) with one or more organometallic compounds having the general formula $MR^1_aQ_{b-a}$ wherein M is the a metal atom, $R^1$ is a hydrocarbyl group, Q is halogen or an oxyhydrocarbyl group, b is the valency of M and a is an integer from 1 to b and wherein the metal is aluminium, boron, lithium, zinc or magnesium.
  (C) impregnating the solid product from step (B) with one or more halogen-containing transition metal compounds wherein the transition metal or metals comprise titanium and/or vanadium, and/or zirconium.

Throughout this specification silicon and boron are regarded as metals.

In step A the refractory oxide support material is suitably any particulate oxide or mixed oxide, e.g. silica, silica-alumina, alumina, zirconia, thoria, titania or magnesia, having surface hydroxyl groups capable of reacting with the halogen free metal derivative.

Preferred support materials are those suitable for use in the well known Phillips process for the polymerisation of ethylene (see for example UK Patent Spefication Nos. 790,195; 804,641; 853,414; French Pat. Nos. 2,015,128; 1,015,130 and Belgium Pat. No. 741,437). Microspheroidal silicas and silica-aluminas having a means particle diameter in the range of 30 to 300 μm, a surface area of 50 to 1000 square meters per gram and a pore volume of 0.5 to 3.5 cc/gram are particularly preferred.

The metal in the halogen-free metal derivative is suitably selected from titanium, aluminium, nickel, vanadium, zirconium, boron, magnesium, silicon, zinc or tin.

The halogen-free metal derivative contains one or more hydride "atoms" and/or one or more organic groups. By an organic group is meant a group containing at least carbon and hydrogen, optionally containing oxygen and/or nitrogen. Examples of suitable organic groups are alkyl, aryl, alkenyl, alkoxy, aryloxy, carboxylate or alkylamino. The organic group can be mono- or poly-valent. Examples of halogen-free metal derivatives are titanium tetraisopropylate, titanium acetylacetonate, titanocene diacetate, triethylaluminium, diethylaluminium hydride, dibutylaluminium hydride, aluminium isopropylate, nickel acetate, nickel acetylacetonate, nickelocene vanadylethylate ($VOEt_3$), vanadyl isopropylate, zirconium tetraisopropylate, zirconium tetrabutylate, triethyl boron, triethyl borate, magnesium diethylate, dibutyl magnesium, tetraethyl silicate, diethyl zinc, tributyl tin hydride and butyl octyl magnesium.

The quantity of halogen-free metal derivative employed in step (A) of the present invention is suitably 0.005 to 2.0 moles, preferably 0.1 to 0.5 moles based on the number of moles of hydroxyl groups present in the refractory oxide support material. If the halogen-free metal derivative reacts with water, it is preferred to dry the refractory oxide support material prior to the performance of step (A) of the present invention and to carry out step (A) under substantially anhydrous conditions.

The refractory oxide support material and the halogen-free metal derivative are brought together in step A of the present invention in any desired manner. If the halogen-free metal derivative is a solid it is preferred to dissolve the solid in a suitable inert liquid diluent and to mix the solution with the refractory oxide and evaporate the diluent prior to or during the heating in step A.

The heating in step A is carried out at a temperaure in the range 250° to 1100° C., preferably 400° to 900° C. The heating may be continued as long as desired but is preferably carried out for a length of time within the range of 30 minutes to 24 hours. The heating may be carried out, for example, in vacuo, in an inert gas atmosphere (e.g. nitrogen or argon), or in air. Preferably the mixture of refractory oxide support material and halogen-free metal derivative are fluidised by inert gas or air during the heating in step A.

The product from step A in the present invention is then reacted with the organometallic compound defined in step B. The organometallic compound must contain at least one metal-carbon bond. Preferred organometallic compounds are trihydrocarbyl aluminium, trihydrocarbyl boron, dihydrocarbyl zinc or magnesium and hydrocarbyl lithium compound. Examples of organometallic compounds which can be employed are triethyl aluminium, isoprenyl aluminium, diethyl aluminium chloride, diethyl aluminium ethoxide, triethyl boron, dibutyl magnesium, ethyl magnesium bromide, diethyl zinc and butyl lithium. Aluminium trialkyls are particularly preferred, especially those containing 1 to 10 carbon atoms in each alkyl group.

The quantity of organometallic compound employed in step B is suitably in the range 0.1 to 10.0 moles, preferably 0.5 to 1.5 moles per mole of surface hydroxyl groups on the original refractory oxide support material.

The reaction between the organometallic compound and the product from step A can be conducted in any desired manner provided that the reaction mixture is substantially free from water and other impurities containing reactive groups which react with the organometallic compound. The reaction can be conducted in the present of an inert diluent or solvent for the organometallic compound if desired. Examples of suitable solvents are liquid hydrocarbons, for example, cyclohexane or normal-hexane. The reaction is preferably carried out in a solvent at a temperature betwee ambient and the boiling point of the solvent, for example at a temperature in the range 10°–80° C., although temperatures above or below this range can be employed if desired. The reaction between the organometallic compound and the product from step A generally occurs rapidly at ambient temperature and a reaction time of one hour or less is normally adequate although longer times can be employed if desired.

After the reaction between the organometallic compound and the product from step A is substantially complete, the unadsorbed organometallic compound, if any, can be separated from the solid product from step B if desired. The separation can be achieved, for example, by washing the solid product with an anhydrous inert solvent, for example, cyclohexane, normal-hexane or petroleum water. The solid product must be protected from contact with other substances with which it may deleteriously react, for example air.

In step C the solid product is impregnated with one or more halogen-containing transition metal compounds wherein the transition metal or metals comprise titanium, vanadium or zirconium. The titanium or zirconium is preferably tetravalent and the vanadium is preferably tetra- or penta-valent. Preferably these compounds are selected from compounds having the general formulae DY, DOY$_{(p-2)}$ and D(OR$^2$)$_s$Y$_{p-s}$ wherein D is the titanium, vanadium or zirconium; Y is halogen, preferably chlorine; O is oxygen; R$^2$ is a hydrocarbyl group, for example alkyl, aryl or cycloalkyl preferably containing 1-10 carbon atoms; p is the valency of D; and s is an integer from 1 to p-1. Examples of suitable titanium compounds are titanium tetrachloride, trichlorotitanium ethylate, dichlorotitanium diisopropylate and titanium oxychloride. Examples of suitable vanadium compounds are vanadyl chloride and vanadium tetrachloride. Examples of suitable zirconium compounds are zirconium tetrachloride and zirconyl chloride. Titanium tetrachloride and vanadyl chloride or mixtures thereof are preferred.

The quantity of transition metal compound employed in preparing the catalyst of the present invention is suitably 0.05 to 10 moles, preferably 0.1 to 1.5 moles, most preferably 0.4 to 1.0 moles per mole of hydroxyl groups in the original support material. When a mixture of titanium and vanadium compounds is employed in step C of the present invention, preferably the atomic ratio of Ti:V used in the catalyst preparation is in the range 100:1 to 1:100, most preferably 10:1 to 1:10.

The impregnation can be carried out using the neat (undiluted) transition metal compounds or by dissolving the transition metal compound(s) in an inert solvent, for example a liquid hydrocarbon solvent. The inert solvent when used must be free from functional groups capable of reacting with the solid material obtained from step B and the transition metal compound(s). Cyclohexane is an example of a suitable inert solvent. The impregnation step is preferably carried out by contacting the solid material obtained from step B with the transition metal compound(s) at a temperature in the range 10° to 150° C. It is particularly preferred to carry out the impregnation by stirring the mixture of said solid material and transition metal compound(s) in an inert solvent at a temperature in the range of 10° to 30° C. The contacting in the impregnation step C is preferably carried out for a time in the range 10 minutes to 24 hours.

The catalyst obtained from step C is preferably separated from any unabsorbed transition metal compound by conventional means, for example, washing with dry inert solvent, or, if volatile transition metal compound(s) have been employed, by purging with inert gas, e.g. nitrogen, helium or argon. Preferably the separation is carried out by washing the catalyst several times with aliquots of dry hydrocarbon solvent. The catalyst may be stored as the dry material in a suitable nonreactive atmosphere, e.g. argon, nitrogen or other inert gas, or as a slurry in inert solvent.

The present invention further comprises a process for polymerising one or more 1-olefins comprising contacting the monomer under polymerisation conditions with the catalyst of the present invention, preferably in the presence of a Ziegler catalyst activator. Ziegler catalyst activators and the methods in which they are used to activate Ziegler catalysts are well known. Ziegler catalyst activators are organometallic derivatives or hydrides of metals of Groups I, II, III, and IV of the Periodic Table. Particularly preferred are trialkyl aluminium compounds or alkylaluminium halides, for example triethylaluminium, tributylaluminium and diethylaluminium chloride. When a Ziegler catalyst activator is employed, preferably it is present in an amount such that the atomic ratio of metal atoms in the activator: total transition metal supported on the catalyst support is not greater than 10:1.

The polymerisation process of the present invention can be applied to the homopolymerisation of 1-olefins, e.g. ethylene or propylene, or to the copolymerisation of mixtures of 1-olefins, e.g. ethylene with propylene, 1-butene, 1-pentene, 1-hexene, 4-methylpentene-1, 1,3-butadiene or isoprene. The process is particularly suitable for the homopolymerisation of ethylene or the copolymerisation of ethylene with up to 40% weight (based on total monomer) of comonomers.

The polymerisation conditions can be in accordance with known techniques used in supported Ziegler polymerisation. The polymerisation can be carried out in the gaseous phase or in the presence of a dispersion medium in which the monomer is soluble. As a liquid dispersion medium, use can be made of an inert hydrocarbon which is liquid under the polymerisation conditions, or of the monomer or monomers themselves maintained in the liquid state under their saturation pressure. The polymerisation can if desired be carried out in the presence of hydrogen gas or other chain transfer agent to vary the molecular weight of the produced polymer.

The polymerisation is preferably carried out under conditions such that the polymer is formed as solid particles suspended in a liquid diluent. Generally the diluent is selected from paraffins and cycloparaffins having from 3–30 carbon atoms per molecule. Suitable diluents include for example isopentane, isobutane, and cyclohexane. Isobutane is preferred.

Methods of recovering the product polyolefin are well known in the art.

The polymerisation catalyst of the present invention can be used to make high density ethylene polymers and copolymers at high productivity having properties which render them suitable for a variety of applications. The catalyst exhibits good hydrogen sensitivity, i.e. the melt index of the produced polyolefins can be varied widely by employing hydrogen at different concentrations as chain transfer agent in the polymerisation process.

The invention is further illustrated by the following Examples.

In the Examples the melt index ($MI_{2.16}$) and high load melt index ($MI_{21.6}$) were determined according to ASTM method D 1238 conditions E and F respectively; the units are grams per 10 minutes.

Kd is a numerical measure of the molecular weigh distribution of the polymer and is determined by a method similar to that disclosed in Sabia, R., J. Appl. Polymer Sci., 1963, 7, 347.

EXAMPLE 1

Catalyst Preparation

In step A of the catalyst preparation, silica (Davison 951 grade, 35 g) was slurried in petroleum ether (40°–60° C. boiling range, 250 ml) in a nitrogen purged flask and titanium tetraisopropylate (10.6 ml) added. Stirring was continued for 1 hour after which the petroleum ether was removed on a rotary evaporator. The dried support was heated at 750° C. in a bed fluidised with air for 5 hours. In step B, 10 g of the resulting material, which contained 6.0% titanium by weight, were stirred in dry cyclohexane (150 ml) in a nitrogen purged flask. Triethylaluminium (10% w/w solution in hexane, 43 ml, 3.0 g) was added dropwise, with stirring. Stirring was continued for 90 min after the addition was complete. The suspension was allowed to settle, the supernatent liquor decanted off, and fresh dry cyclohexane (150 ml) added. In step C, a mixture of titanium tetrachloride (1.08 g) and vanadium oxytrichloride (1.25 g) in dry cyclohexane (60 ml) was added dropwise, with stirring, to the reaction vessel. Stirring was continued for 90 min after the addition was complete. The catalyst was allowed to settle, the supernatent liquor decanted off, and the volume made up to ca. 350 ml with fresh dry cyclohexane. The catalyst was used as a slurry and stored under nitrogen. A sample of the catalyst was dried and found by elementary analysis to contain 3.4% Al, 5.4% Ti, 2.3% V and 9.5% Cl.

Polymerisation

Polymerisation was carried out in a 2.3 liter capacity stainless steel stirred autoclave. The reactor was purged with dry nitrogen, baked for 2 hours at 110° C., and then cooled to 75° C. The catalyst slurry (118 mg dry weight) was added to the reactor using a syringe. Triethyl aluminium (0.5 ml of a 10% weight/weight solution of $AlEt_3$ in hexane) was added to improve the catalyst activity, together with isobutane (1 liter). The vessel was reheated to 90° C. and hydrogen (6.9 bar) was introduced. Then ethylene was introduced to bring the total pressure in the reactor to 41.4 bar, and further ethylene was introduced throughout the duration of the polymerisation to maintain the pressure at 41.4 bar. The polymerisation temperature was 90° C.

At the end of the polymerisation (about 1 hour) the diluent and unreacted ethylene was vented off and the polyethylene powder recovered. The polyethylene yield was 348 g and the catalyst activity 2950 kg/kg/hour. The polyethylene was washed with acetone and treated with conventional stabilizer and the properties measured using standard procedures. The polymer properties were as follows $MI_{2.16}$ was 1.0 g/10 minutes, $MI_{21.6}$ was 34.7 g/10 minutes, Kd was 2.4. Screening through standard sieves showed that the polymer only contained 0.7 wt % of particles below 106 μm.

EXAMPLE 2

Silica (Davison 952 Grade, 40 g) was suspended in a solution of aluminium isopropoxide (15.1 g) in toluene (500 ml) and the mixture heated under reflux, with stirring, for 2½ hours. The solvent was removed on a rotary evaporator and the dried powder calcined for 2 hours at 500° C. in a bed fluidised with air. The support material was cooled in a flow of dry nitrogen and stored under nitrogen prior to use. A portion of this material was used in the remaining catalyst preparation steps (steps 'B' and 'C'); these were carried out in the same manner as described in Example 1, except that the catalyst was washed with cyclohexane (250 ml) before finally being made up with cyclohexane. The quantities of the reagents used are shown in Table 1.

Polymerisation

Polymerisation was carried out as described in Example 1. Polymerisation results and polymer properties are summarised in Table 2.

EXAMPLE 3

Silica (Davison 952 Grade, 40 g) was suspended in a solution of nickel acetate (8.47 g) in ethanol (300 ml) and the mixture stirred for 15 min. The solvent was removed on a rotary evaporator and the dried powder calcined for 1 hour at 550° C. in a bed fluidised with air. The support material was cooled in a flow of dry nitrogen and stored under nitrogen prior to use. Analysis of the support material showed it to contain 4.7% Ni by weight. A portion of this material was used in the remaining catalyst preparation steps (steps 'B' and 'C'); these were carried out in the same manner as described in Example 1, except that the alkylated support was washed with cyclohexane (250 ml) after decantation (end of step 'B') and the catalyst was washed twice with cyclohexane (250 ml each time) after decantation (end of step 'C'). The quantities of reagents used and the analysis of the dried catalyst are shown in Table 1.

Polymerisation

Polymerisation was carried out as described in Example 1. Polymerisation results and polymer properties are summarised in Table 2.

TABLE 1

| | | Step 'B' | | Step 'C' | | | | | |
|---|---|---|---|---|---|---|---|---|---|
| | | Wt support | Wt AlEt$_3$ | Wt TiCl$_4$ | Wt VOCl$_3$ | Analysis (Wt %) | | | |
| Example | Support Material | (g) | (g) | (g) | (g) | Ni | Al | Ti | V | Cl |
| 2 | Al-modified silica | 11.2 | 3.4 | 0.39 | 1.4 | — | 11.0 | 0.85 | 2.6 | 6.3 |
| 3 | Ni-modified silica | 9.1 | 3.8 | 2.4 | 1.0 | 3.5 | 2.5 | 2.4 | 2.4 | 5.5 |

TABLE 2

| | | | | | | | Polymer properties | | |
|---|---|---|---|---|---|---|---|---|---|
| | | Wt. catalyst | Vol. cocatalyst* | Polymerisation time | Yield | Activity | MI$_{2.16}$ (g/10 | MI$_{21.6}$ (g/10 | |
| Example | Support Material | (mg) | (ml) | (min) | (g) | (kg/kg.h) | min) | min) | Kd |
| 2 | Al-modified silica | 103.5 | 0.5 | 60 | 96 | 930 | 0.63 | 28.4 | 4.0 |
| 3 | Ni-modified silica | 123 | 0.5 | 50 | 366 | 3570 | 0.41 | 16.9 | NM |

*10% w/w solution of AlEt$_3$ in hexane
NM = not measured

I claim:

1. A supported Ziegler catalyst prepared by the following steps:
   (A) heating together at a temperature in the range 250° to 1100° C. a refractory oxide support material having surface hydroxyl groups and one or more halogen-free metal derivatives which are hydrides and/or organic derivatives of the metal, said metal being selected from the group consisting of titanium, aluminum, nickel, vanadium, zirconium, boron, magnesium, silicon, zinc, and tin
   (B) reacting the product from (A) with one or more organometallic compounds having the general formula MR$_a^1$Q$_{b-a}$ wherein M is a metal atom, R$^1$ is a hydrogen group, Q is halogen or an oxyhydrocarbyl group, b is the valency of M and a is an integer from 1 to b and wherein the metal atom H is aluminium, boron, lithium, zinc or magnesium,
   (C) impregnating the solid product from step (B) with one or more halogen-containing transition metal compounds wherein the transition metal or metals comprise titanium and/or vanadium and/or zirconium.

2. A catalyst as claimed in claim 1 wherein the refractory oxide support material is silica, silica-alumina, alumina, zirconia, thoria, titania or magnesia.

3. A catalyst as claimed in claim 1 or 2 wherein the refractory oxide support material is silica or silica-alumina having a mean particle diameter in the range 30 to 300 μm.

4. A catalyst as claimed in claim 1 or claim 2 wherein the metal in the halogen-free metal derivative employed in step A is selected from titanium, aluminium, nickel, vanadium, zirconium, boron, magnesium, silicon, zinc and tin.

5. A catalyst as claimed in claim 1 or claim 2 wherein the halogen-free metal derivative employed in step A contains one or more hydride atoms.

6. A catalyst as claimed in claim 1 or claim 2 wherein the halogen-free metal derivative contains one or more organic groups selected from alkyl, aryl, alkenyl, alkoxy, aryloxy, carboxylate and alkylamino groups.

7. A catalyst as claimed in claim 1 or claim 2 where the quantity of halogen-free metal compound employed in step A is 0.1 to 0.5 moles per mole of hydroxyl groups present in the refractory oxide support material.

8. A catalyst as claimed in claim 1 or claim 2 wherein the heating in step A is carried out at a temperature in the rangge 400° to 900° C.

9. A catalyst as claimed in claim 1 or claim 2 wherein the organometallic compound employed in step B is an aluminium trialkyl.

10. A catalyst as claimed in claim 1 or claim 2 wherein the quantity of organometallic compound employed in step B is in the range 0.5 to 1.5 moles per mole of surface hydroxyl groups present on the original refractory oxide support material.

11. A catalyst as claimed in claim 1 or claim 2 wherein the transition metal compound employed in step C is titanium tetrachloride, vanadyl chloride or a mixture thereof.

12. A catalyst as claimed in claim 1 or claim 2 wherein the quantity of transition metal compound employed in step C is in the range 0.1 to 1.5 moles per mole of hydroxyl groups present in the original support material.

13. A catalyst as claimed in claim 1 or claim 2 wherein the transition metal compound comprises a mixture of titanium and vanadium compounds.

14. A supported Ziegler catalyst prepared as defined in claim 1 or claim 2 to which there is added during use a Ziegler catalyst activator.

15. A supported Ziegler catalyst as defined in claim 14 wherein said Ziegler catalyst activator is a trialkyl aluminum compound or an alkyl aluminum halide.

* * * * *

UNITED STATES PATENT AND TRADEMARK OFFICE
CERTIFICATE OF CORRECTION

PATENT NO. : 4,396,533
DATED : August 2, 1983
INVENTOR(S) : ALEXANDER JOHNSTONE

It is certified that error appears in the above—identified patent and that said Letters Patent is hereby corrected as shown below:

Col. 3, line 47, after "petroleum", change "water" to --ether--.

Col. 7, line 41, Claim 1, after "atom", change "H" to --M--.

Col. 8, line 32, Claim 8, correct the spelling of "range".

Signed and Sealed this

Third Day of July 1984

[SEAL]

Attest:

Attesting Officer

GERALD J. MOSSINGHOFF

Commissioner of Patents and Trademarks